(12) United States Patent
Azuma et al.

(10) Patent No.: US 11,367,238 B2
(45) Date of Patent: Jun. 21, 2022

(54) IMAGE PROCESSING DEVICE AND IMAGE PROCESSING METHOD

(71) Applicant: RENESAS ELECTRONICS CORPORATION, Tokyo (JP)

(72) Inventors: Yoshiki Azuma, Tokyo (JP); Shinya Tomari, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/032,770

(22) Filed: Sep. 25, 2020

(65) Prior Publication Data

US 2021/0125394 A1 Apr. 29, 2021

(30) Foreign Application Priority Data

Oct. 28, 2019 (JP) .............................. JP2019-195147

(51) Int. Cl.
*G06T 15/00* (2011.01)
(52) U.S. Cl.
CPC .................................. *G06T 15/005* (2013.01)
(58) Field of Classification Search
None
See application file for complete search history.

(56) References Cited

U.S. PATENT DOCUMENTS

| 2002/0084999 A1* | 7/2002 | Shiga | G06T 1/0007 345/418 |
| 2004/0189649 A1* | 9/2004 | Nakatsuka | G06T 15/40 345/501 |
| 2010/0302259 A1* | 12/2010 | Akita | G06T 17/00 345/501 |
| 2015/0287166 A1* | 10/2015 | Cerny | G06T 15/005 345/423 |

FOREIGN PATENT DOCUMENTS

JP 2010-176608 A 8/2010

\* cited by examiner

*Primary Examiner* — Michelle Chin
(74) *Attorney, Agent, or Firm* — McDermott Will & Emery LLP

(57) ABSTRACT

An image processing device includes a three-dimensional graphics processor that generates three-dimensional drawing data based on a three-dimensional drawing command, a command converter that converts the three-dimensional drawing command into a two-dimensional drawing command, a two-dimensional graphics processor that generates two-dimensional drawing data based on the converted two-dimensional drawing command and a display controller that displays the two-dimensional drawing data in place of the three-dimensional drawing data when a load of the three-dimensional graphics processor is high.

14 Claims, 8 Drawing Sheets

IMAGE PROCESSING DEVICE AND IMAGE PROCESSING METHOD

CROSS-REFERENCE TO RELATED APPLICATIONS

The disclosure of Japanese Patent Application No. 2019-195147 filed on Oct. 28, 2019 including the specification, drawings and abstract is incorporated herein by reference in its entirety.

BACKGROUND

The present invention relates to an image processing device and an image processing method, and more particularly, the present invention relates to an in-vehicle image processing device and an image processing method.

An automobile meter cluster (vehicle speed, engine speed, fuel residual, etc.) is being replaced by so-called a digital meter cluster that uses a liquid crystal display to display from conventional mechanical meters.

With the enlargement and high resolution of the liquid crystal display used for the meter cluster, the processing loads of the image processing device are increasing. In addition, advances in the digital meter cluster require not only two-dimensional (2D) displays but also three-dimensional (3D) displays and displays at high frame rates, which further increases the burden of image-processing device.

Patent Document 1 discloses a technique related to a hardware accelerator such as a graphics processing unit (GPU) for speeding up an image processing device.

PRIOR-ART DOCUMENT

Patent Document

[Patent Document 1] Japanese Unexamined Patent Application Publication No. 2010-176608

SUMMARY

In the meter cluster, drawing performance at a higher frame rate such as 60 FPS (Frames Per Second) is required. When drawing is performed in 3D at high frame rate and high resolution, the image-processing device is heavily loaded. In this instance, the processing speed of the image-processing device may decrease, and the requested frame rate may not be satisfied. Since real-time information display is required in an in-vehicle meter cluster, a technique capable of maintaining a high frame rate is required.

Other objects and novel features will become apparent from the description of the specification and drawings.

Means of Solving the Problems

An image processing device according to an embodiment includes a three-dimensional graphics processor that generates three-dimensional drawing data based on a three-dimensional drawing command, a command converter that converts the three-dimensional drawing command into a two-dimensional drawing command, a two-dimensional graphics processor that generates two-dimensional drawing data based on the converted two-dimensional drawing command and a display controller that displays the two-dimensional drawing data in place of the three-dimensional drawing data when a load of the three-dimensional graphics processor is high.

The image processing device according to an embodiment enables display with a high frame rate.

DETAILED DESCRIPTION

Figure 1:
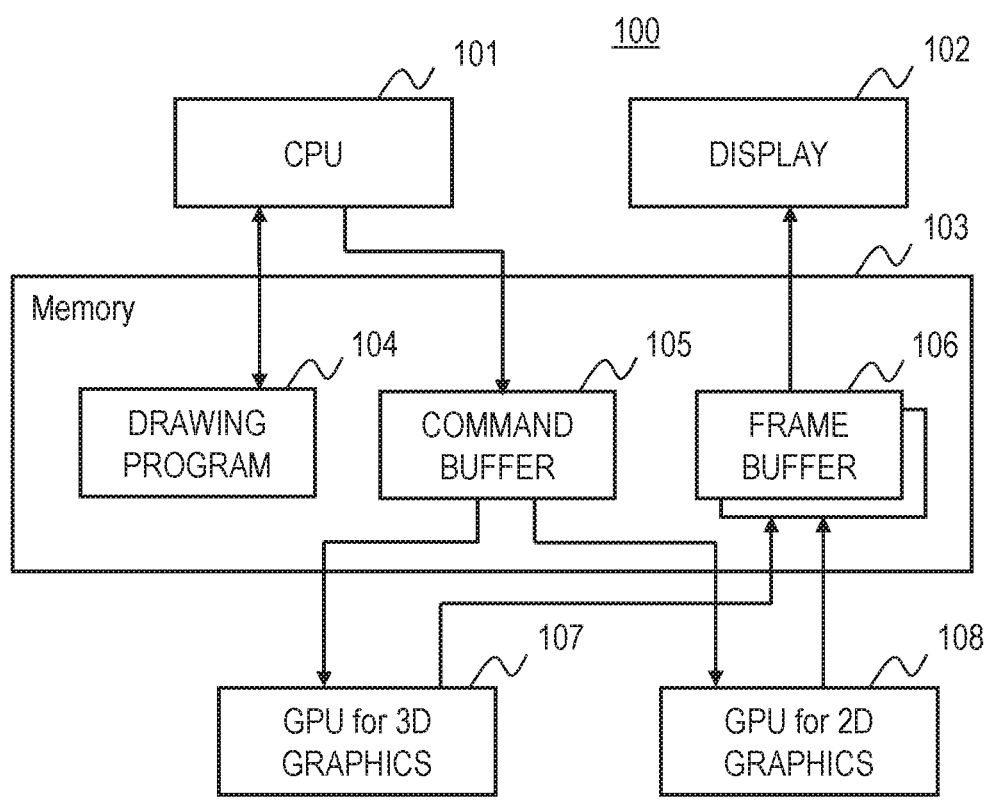
FIG. 1 is a schematic diagram of an image processing device according to a first embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a block diagram showing a configuration of an image processing device 100 according to a first embodiment.

As shown in FIG. 1, the image processing device 100 includes a CPU 101, a display 102, a memory 103, GPU 107 for three-dimensional (3D) graphics, and GPU 108 for two-dimensional (2D) graphics. The memory 103 includes a drawing program 104, a command buffer 105, and a frame buffer 106. A part of the memory may be non-volatile memory.

Figure 2:
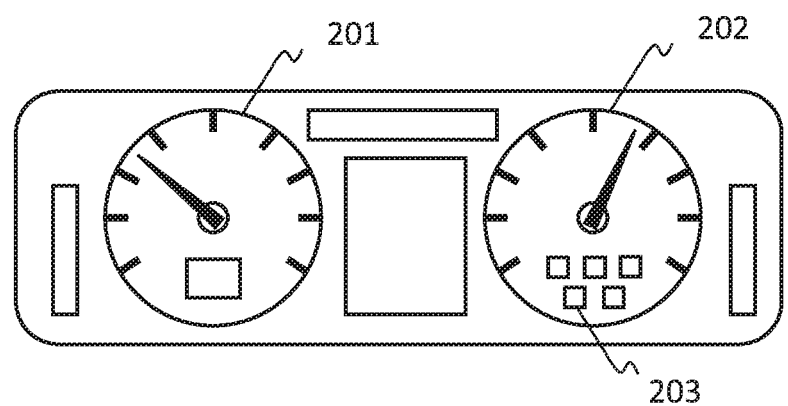
FIG. 2 shows a typical meter cluster according to the first embodiment.

FIG. 2 is a display example of a meter cluster. A speedometer 201, an engine tachometer 202, a warning light 203, a background, and the like are displayed on a display such as a liquid crystal. In FIG. 2, the respective components are displayed in a 2D image, but actually they are displayed in a 3D. In addition, there is a case in which an image of an in-vehicle camera is incorporated in the meter cluster. For example, a rear-view camera, a side view camera, an around view camera, or the like. Graphics such as graphics indicating the vehicle body and guidelines for predicting the traveling direction of the vehicle may be synthesized and displayed on the image from the camera.

The schematic of each block will be described with reference to FIG. 1. CPU 101 executes the drawing program 104 to generate drawing commands for the components to be displayed on the display 102. For example, CPU 101 produces 3D drawing commands for displaying the form of speedometer 201, engine tachometer 202 and warning lights. The generated 3D drawing command is stored in the command buffer 105.

GPU 107 for 3D graphics (also referred to as a three-dimensional image processing device) generates drawing data of a component to be displayed on the display 102 based on the generated 3D drawing commands. The generated drawing data is stored in the frame buffer 106. The display 102 displays the drawing data stored in the frame buffer 106.

Similarly, GPU 108 for 2D graphics (also referred to as a two-dimensional image processing device) generates drawing data of a component to be displayed on the display 102 based on the generated 2D drawing commands. The generated drawing data is stored in the frame buffer 106. Here, in this first embodiment, there is a characteristic in the generation method of 2D drawing command. Will be described later.

If the basic operation described above is, for example, 60 FPS, it is required to be executed 60 times per second. If GPU 107 for 3D graphics and CPU 101 become heavily loaded, 60 FPS may not be satisfied.

Figure 3:
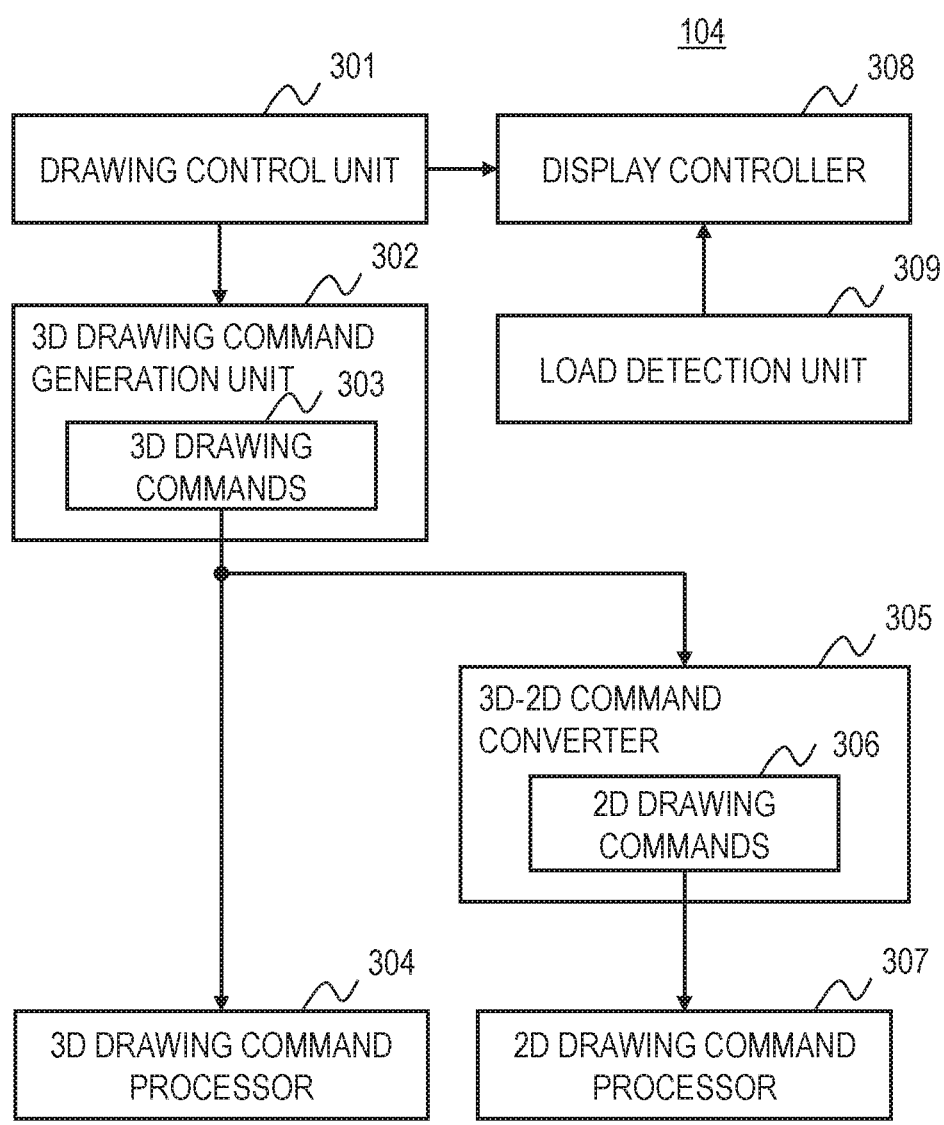
FIG. 3 is a functional diagram of the image processing device according to the first embodiment.
Figure 4:
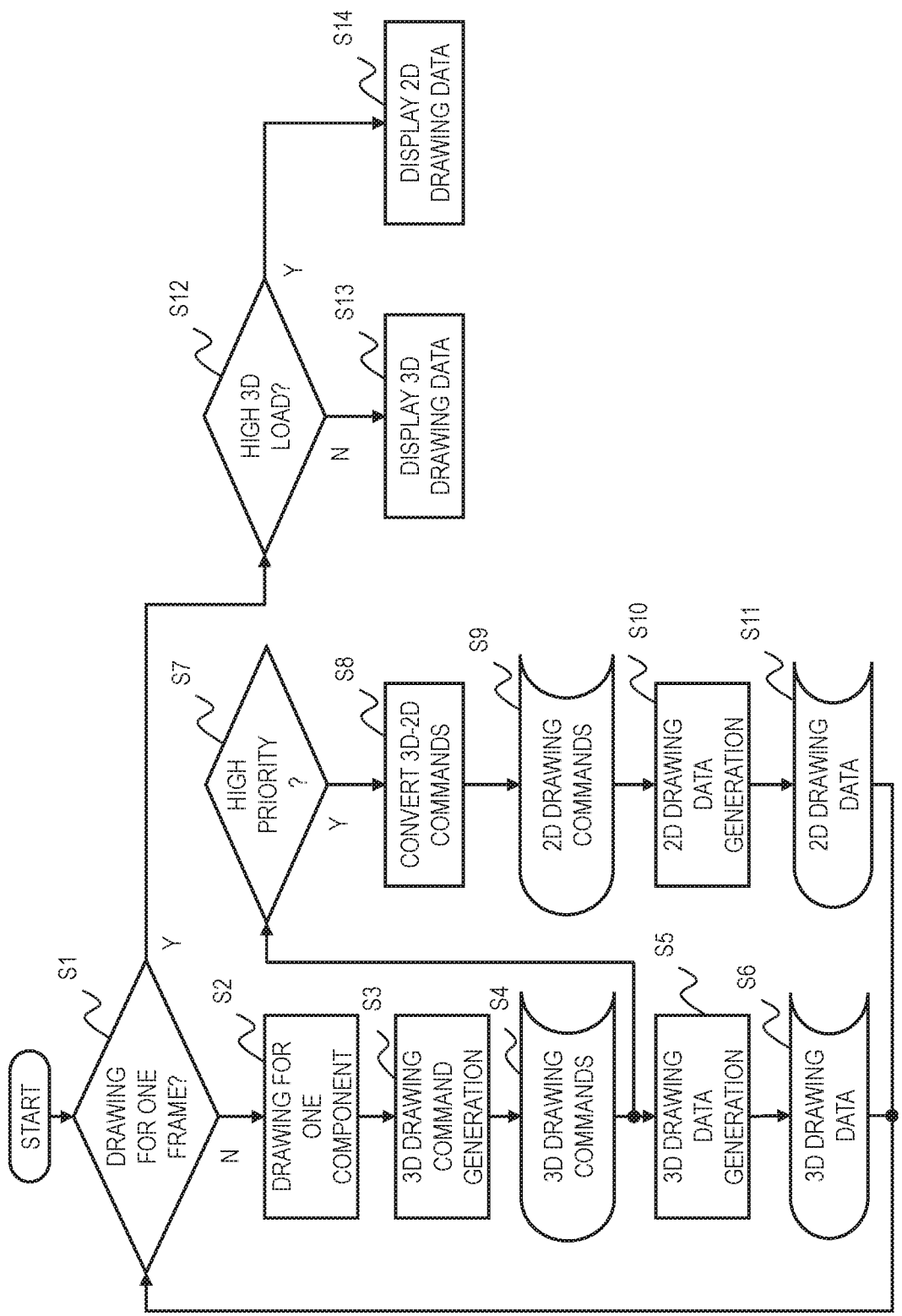
FIG. 4 is a flow chart for explaining the operation of the image processing device according to the first embodiment.

Next, the operation of the image processing device according to first embodiment will be described. FIG. 3 is a block diagram for explaining the function of the drawing program 104. FIG. 4 is a flow chart for explaining the operation of the image processing device 100. In step S1, the drawing control unit 301 operates to generate and display drawing data of one frame as one unit. The drawing control unit 301 issues a drawing instruction to 3D drawing command generation unit 302 as the three-dimensional drawing command generation device for one component (such as a speedometer) to be drawn in one frame (S2).

In step S3, 3D drawing command generation unit 302 generates 3D drawing commands for a drawing target component based on the instruction from the drawing control unit 301. The generated 3D drawing commands 303 are stored in the command buffer 105 (step S4). Here, 3D drawing command generation unit 302 gives priorities to the generated 3D drawing commands. The priority is determined in advance depending on whether or not the component to be displayed is an important display for the meter cluster. For example, because vehicle speed and engine speed are important information, priority information is set in 3D drawing commands for drawing the speedometer and engine tachometer. On the other hand, since the background of the meter cluster is of low importance, 3D drawing commands for background drawing are not set with priority information.

In step S5, 3D drawing command processor 304 generates 3D drawing data of the component to be displayed on the display 102 based on the generated 3D drawing commands 303. When generating 3D drawing data, 3D drawing command processor 204 uses GPU 107 for 3D graphics. The generated 3D drawing data is stored in the frame buffer 106 (step S6). In first embodiment, a plurality of frame buffers 106 are provided, and the frame buffer 106 in which 3D drawing data is stored is a "frame buffer 0" as the first frame buffer.

3D-2D command converter 305 as the command conversion device is a block which is a characteristic block of the present first embodiment. 3D-2D command converter 305 first checks the priority information of the generated 3D drawing commands 303 (Step S7). If the priority information is set in the generated 3D drawing commands 303, the generated 3D drawing commands 303 are converted to 2D drawing commands 306 (Step S8). The converted 2D drawing commands 306 are stored in the command buffer 105 (step S9). When the priority information is not set in the generated 3D drawing commands 303, 3D-2D command converter 305 does not convert 3D drawing commands.

Conversion from 3D commands to 2D commands is performed using a translation table. 2D command corresponding to 3D command is registered in the translation table. The translation table is stored in non-volatile memory.

2D drawing command processor 307 generates 2D drawing data of components to be displayed on the display based on the converted 2D drawing commands 306 (Step S10). When generating 2D drawing data, 2D drawing commands 306 are used by GPU 108 for 2D graphics. In operation S11, the generated 2D drawing data is stored in the frame buffer 106. Here, the frame buffer 106 in which 2D drawing data is stored is a "frame buffer 1" as a second frame buffer.

When 3D drawing data and 2D drawing data relating to one frame are obtained, the drawing control unit 301 instructs the display controller 308 as the display control device to display the drawing data on the display 102 (Y of step S1).

Upon receiving a drawing instruction from the drawing control unit 301, the display controller 308 selects one of 3D drawing data stored in the frame buffer 0 and 2D drawing data stored in the frame buffer 1, and displays the selected one on the display 102. In operation S12, the display controller 308 determines the selection of the frame buffer 0 and the frame buffer 1 based on the processing load information of 3D drawing command processor 304 included in the load detection unit 309. When the processing load of 3D drawing command processor 304 is low, the frame buffer 0 is selected, and when the processing load is high, the frame buffer 1 is selected. In steps S13 and S14, the display controller 308 displays the selected frame buffer 0 or 1 on the display 102. That is, when the processing load of 3D drawing command processor 304 is low, the meter cluster is displayed in 3D, and when the processing load is high, the components having higher priorities among the meter cluster are displayed in 2D.

The load detection unit 309 detects the processing load of 3D drawing command processor 304. Specifically, it detects the processing load based on CPU 101 usage rate and the usage rate of GPU 107 for 3D graphics. The detected processing load is transmitted to the display controller 308 as described above.

As described above, in the image processing device 100 according to first embodiment, when the processing load of 3D graphics is determined to be a high load, the image display can be switched to 2D graphics display for each frame. This makes it possible to maintain the required high frame rate for display. In addition, a priority is set for each component to be displayed, and drawing data for 2D graphics is generated for the component for which the priority is set. This makes it possible to avoid high load on the process of 2D graphics and to ensure that high frame-rate displays are maintained.

Second Embodiment

Figure 5:
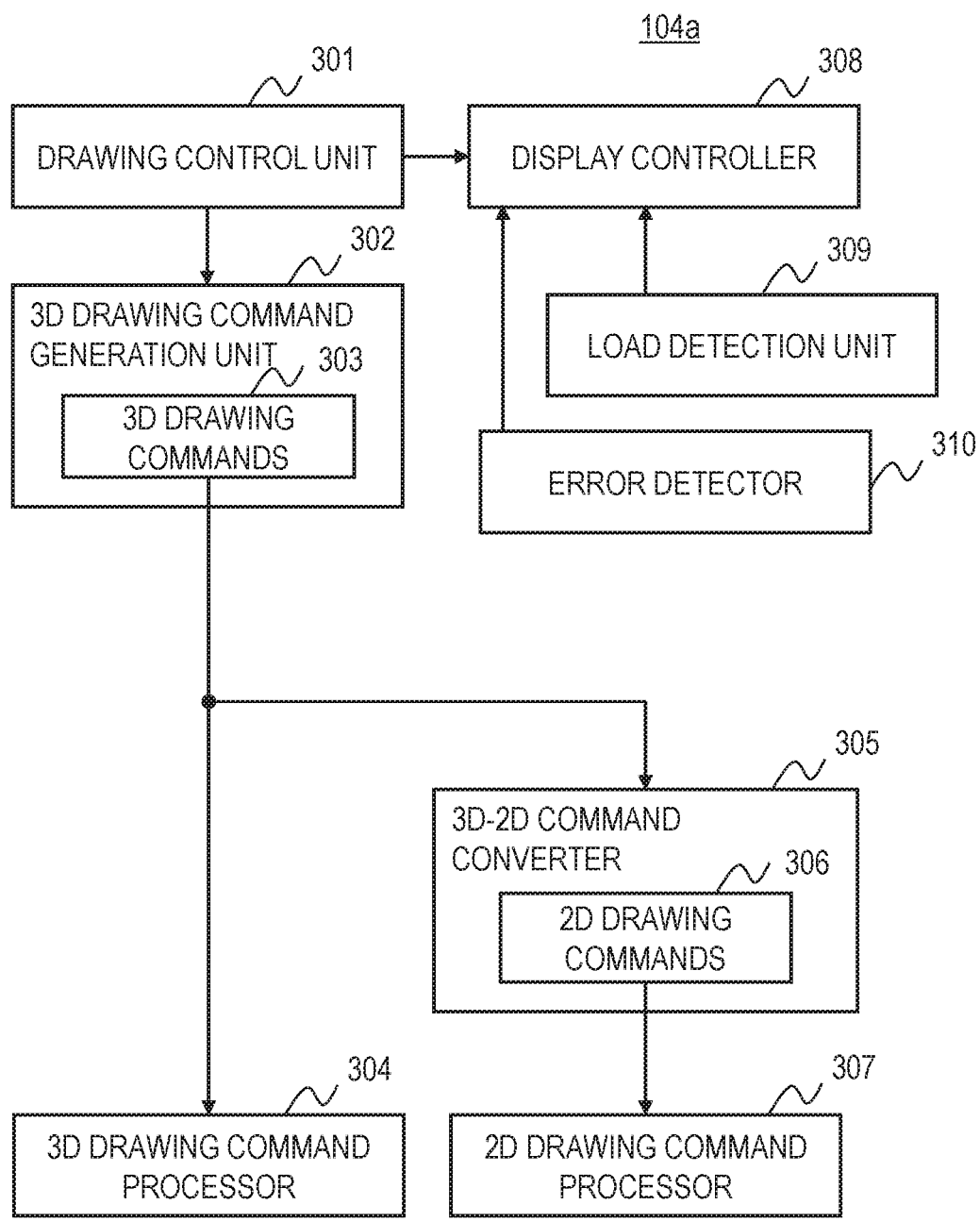
FIG. 5 is a functional block diagram of an image processing device according to a second embodiment.

The configuration of the image processing device according to second embodiment is the same as that of FIG. 1. This second embodiment differs from first embodiment in the function of drawing program. FIG. 5 is a block diagram for explaining the functions of the drawing program 104*a* according to the second embodiment. The difference from first embodiment is that an error detector 310 is added.

The error detector 310 monitors the operation status of 3D drawing command processor 304. Specifically, when an error occurs during processing, GPU 107 for 3D graphics outputs an interrupt signal and notifies CPU 101 of the error. The error detector 310 can detect the occurrence of an error based on the interrupt signal.

The display controller 308 selects the frame buffer 0 and the frame buffer 1 in consideration of not only the processing load information included in the load detection unit 309 but also the error information included in the error detector 310.

Next, the operation of the image processing device according to second embodiment will be described. 100*a*

Figure 6:
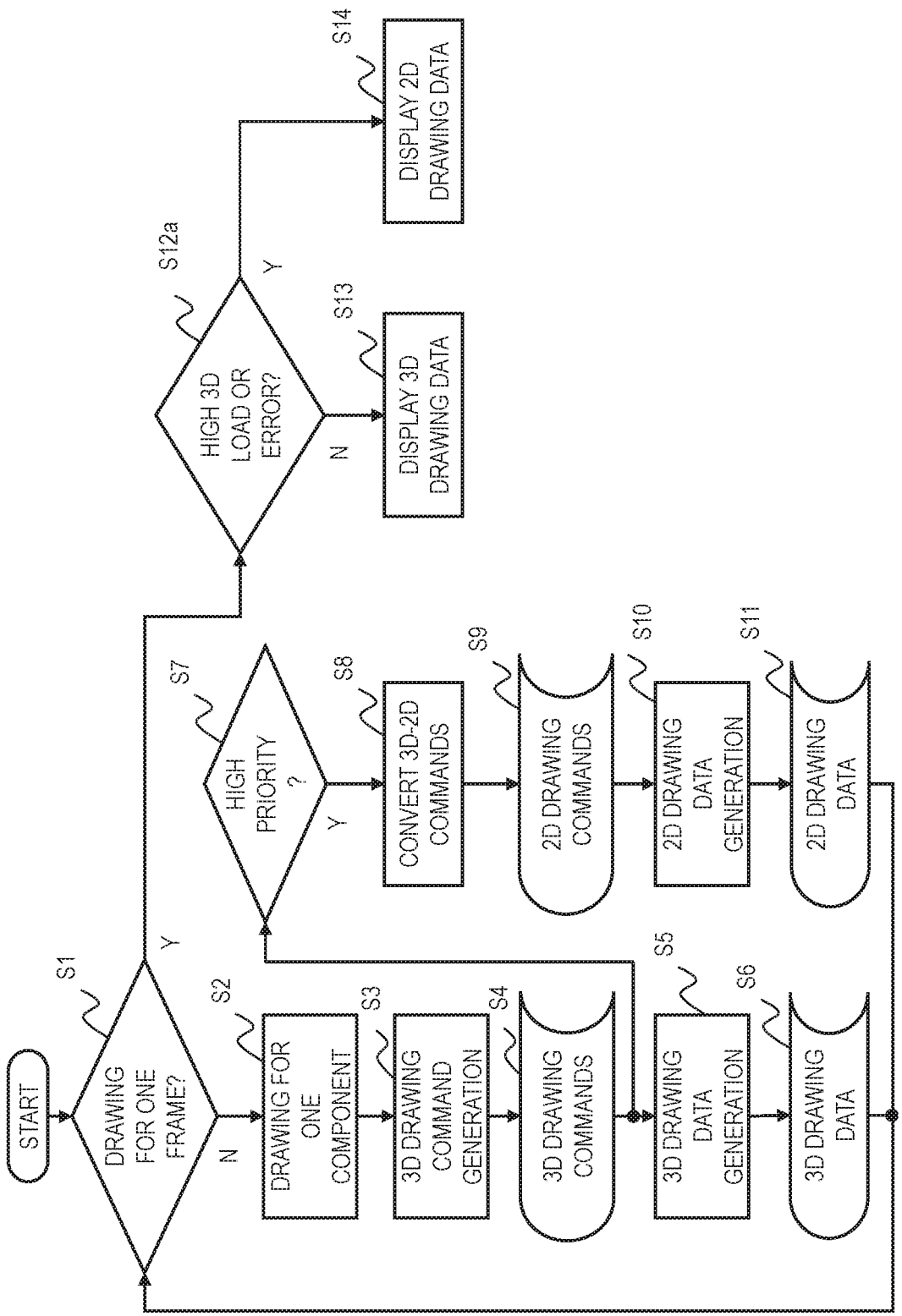
FIG. 6 is a flow chart for explaining the operation of the image processing device according to the second embodiment.

FIG. 6 is a flow chart for explaining the operation of the image processing device according to second embodiment. The difference from first embodiment is that step S12 is changed to step S12*a*. The steps up to step S11 are the same as those in first embodiment, and therefore the explanation thereof is omitted.

Upon receiving a drawing instruction from the drawing control unit 301, the display controller 308 selects one of 3D drawing data stored in the frame buffer 0 and 2D drawing data stored in the frame buffer 1, and displays the selected one on the display 102. The display controller 308 determines the selection of the frame buffer 0 and the frame buffer 1 by the processing load information of 3D drawing command processor 304 that the load detection unit 309 has and the error information that the error detector 310 as the error detecting device has (step S12*a*). If the processing load of 3D drawing command processor 304 is low and error has not occurred, the frame buffer 0 is selected. When the processing load of 3D drawing command processor 304 is high or error has occurred, the frame buffer 1 is selected. In steps S13 and S14, the display controller 308 displays the selected frame buffer 0 or 1 on the display 102. That is, if the processing load of 3D drawing command processor 304 is low and no error has occurred, the meter cluster is displayed in 3D, and if the processing load is high or an error has occurred, a higher-priority component in the meter cluster is displayed in 2D.

As described above, in the image processing device according to second embodiment, in addition to the effects of first embodiment, even if an error occurs during the processing of 3D graphics, it is possible to maintain the display at a high frame rate.

Third Embodiment

Figure 7:
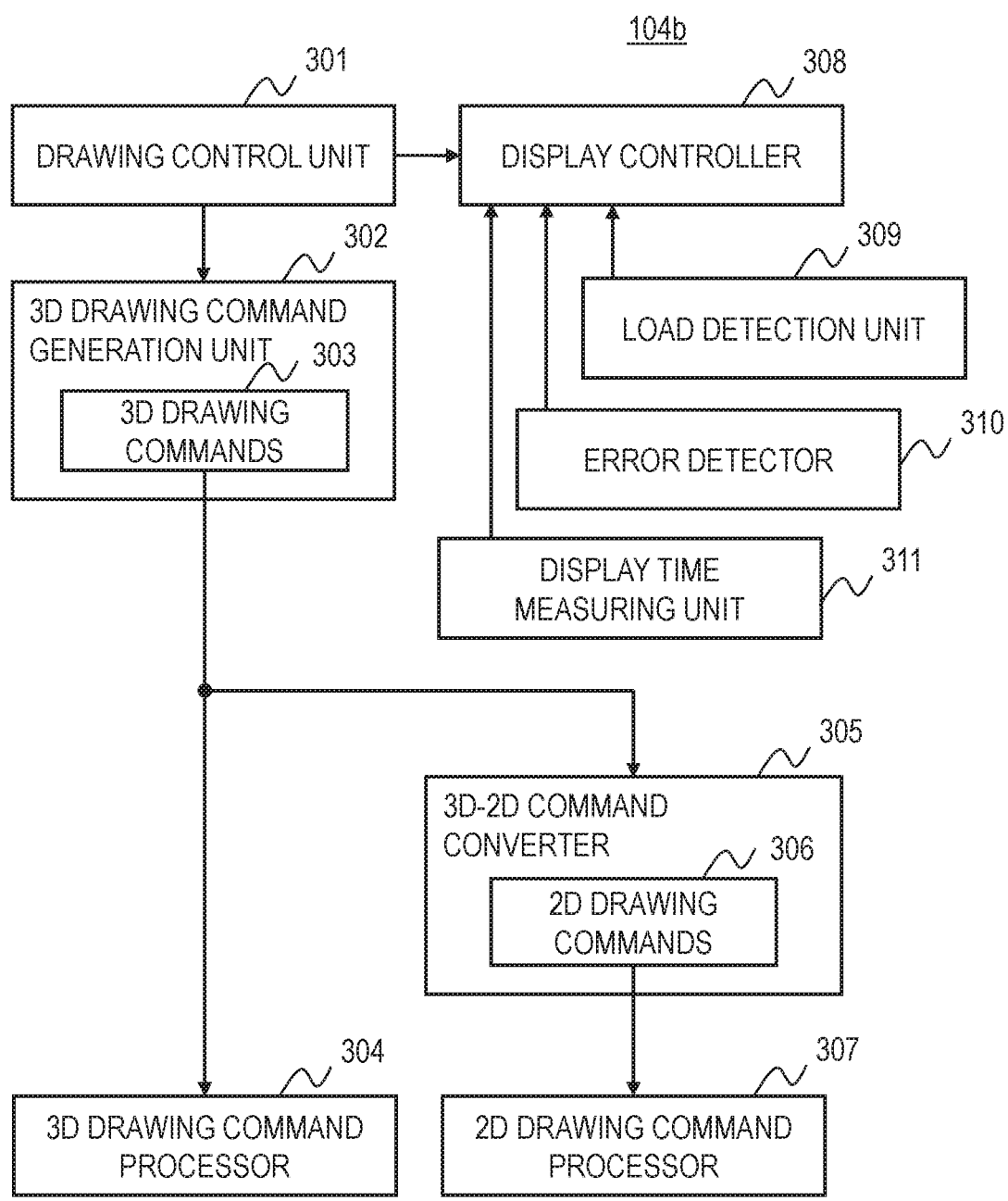
FIG. 7 is a functional block diagram of an image processing device according to a third embodiment.

The configuration of the image processing device according to third embodiment is the same as that of FIG. 1. In third embodiment, the functions of the drawing program differ from those of first and second embodiments. FIG. 7 is a block diagram for explaining the functions of the drawing program 104*b* according to the third embodiment. The difference from second embodiment is that a display time measuring unit 311 is added.

When the display controller 308 displays 2D drawing data on the display 102, the display time measuring unit 311 sets a flag indicating that 2D drawing data has been displayed. In addition, a display time during which 2D drawing data is displayed are measured. The unit of measurement may be seconds or the number of frames. When the measurement time exceeds the predetermined time, the flag is reset, and the display time measurement is stopped.

The display controller 308 displays 3D drawing data or 2D drawing data on the display 102 in accordance with not only the load and error information of 3D drawing command processor 304 but also the display time during which 2D drawing data is displayed on the display 102.

Next, the operation of the image processing device according to third embodiment will be described.

Figure 8:
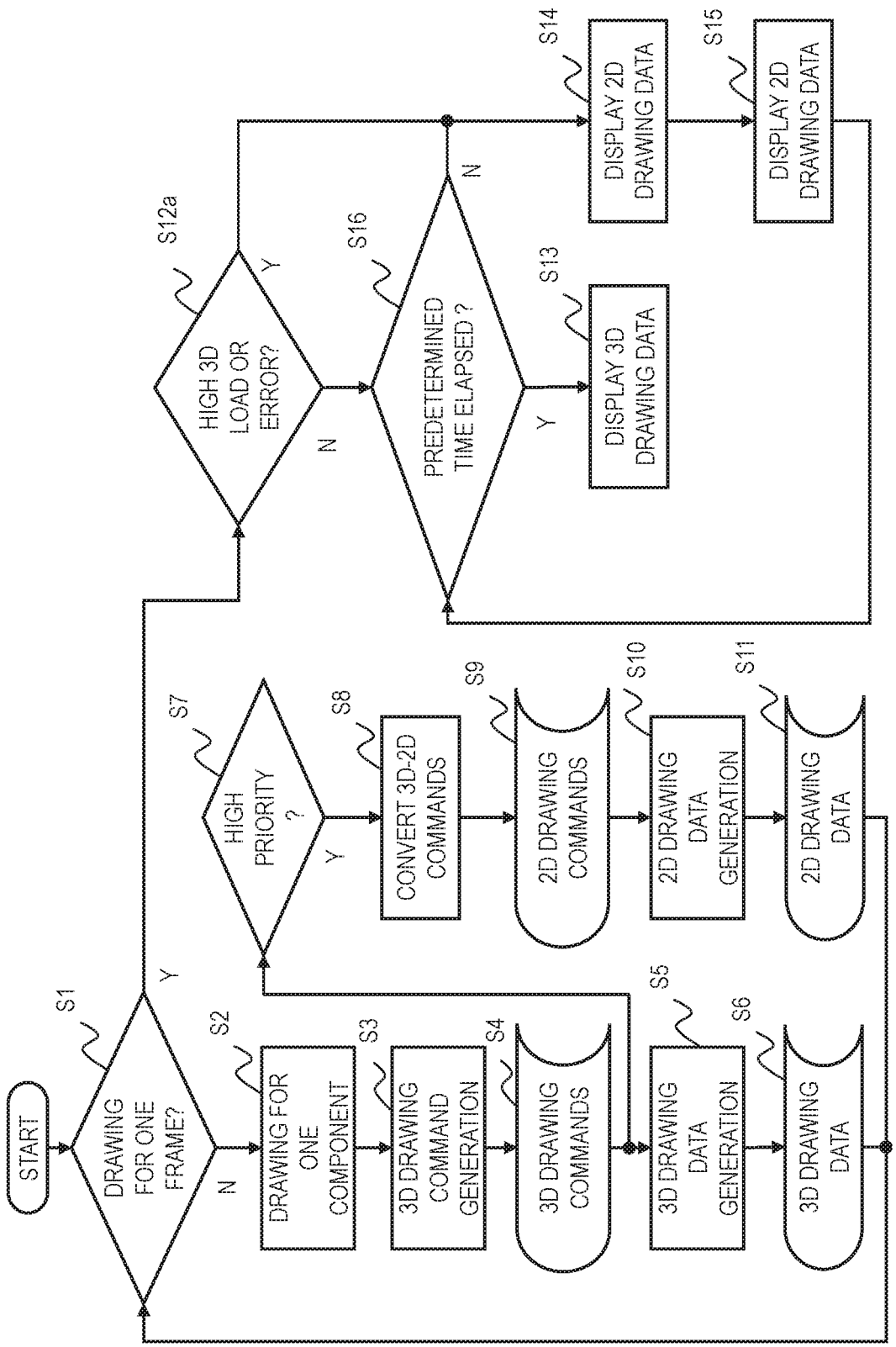
FIG. 8 is a functional block diagram of the image processing device according to the third embodiment.

FIG. 8 is a flow chart for explaining the operation of the image processing device according to third embodiment. The difference from second embodiment is that steps S15 and S16 are added. The steps up to the step S12*a* are the same steps as those in the second embodiment, and therefore the explanation thereof is omitted.

In the N-th frame (where N is an integer of one or more), a case where the display controller 308 selects 2D drawing data and displays 2D drawing data will be described. In operation S15, the display time measurement unit 311 as a display time measurement device sets a flag and starts measurement of the time during which 2D drawing data is displayed.

In the (N+1) subsequent frames, when the display controller 308 selects 3D drawing data, the display controller 308 confirms the measurement time in the display time measuring unit 311 (step S16). When the measurement time in the display time measurement unit 311, that is, the display time of 2D drawing data exceeds a predetermined value, the display controller 308 displays 3D drawing data of the frame buffer 0 on the display 102. In this instance, the display time measurement unit 311 resets the flag, and stops the measurement of the time during which 2D drawing data is displayed. When the display time of 2D drawing data does not exceed the predetermined time, the display controller 308 displays 2D drawing data of the frame buffer 1 on the display 102. In this instance, the display time measurement unit 311 continues the measurement of the time during which 2D drawing data is displayed.

Here, the predetermined value is assumed to be M (M is an integer greater than or equal to 1) frame. In N frames to (N+M−1) frames, 2D drawing data is displayed on the display 102 regardless of the selection of S12*a* step. Since the flag of the display time measuring unit 311 is reset at the time of the (N+M−1)-th frame, 3D drawing data or 2D drawing data selected in the step S12*a* is displayed in the (N+M)-th frame.

As described above, in the image processing device according to the third embodiment, the display of 2D drawing data can be maintained for a predetermined period in addition to the effects of first and second embodiments. In first and second embodiments, when the processing load of 3D drawing command processor 304 is increased or decreased repeatedly, 3D display and 2D display are frequently switched. Such a display is undesirable for a user viewing an image. According to the third embodiment, display in which 3D display and 2D display are frequently switched can be reduced.

It should be noted that the present invention is not limited to the above-mentioned embodiments, and various modifications can be made without departing from the gist thereof.

What is claimed is:

1. An image processing device comprising:
   a three-dimensional graphics processor that generates three-dimensional drawing data based on a three-dimensional drawing command;
   a command converter that converts the three-dimensional drawing command into a two-dimensional drawing command;
   a two-dimensional graphics processor that generates two-dimensional drawing data based on the converted two-dimensional drawing command; and
   a display controller that displays the two-dimensional drawing data in place of the three-dimensional drawing data when a load of the three-dimensional graphics processor is high.

2. The image processing device according to claim 1, wherein the command converter converts the three-dimensional drawing command into the two-dimensional drawing command based on a priority set in the three-dimensional drawing command.

3. The image processing device according to claim 2, further comprising:
a first frame buffer that stores the three-dimensional drawing data; and
a second frame buffer that stores the two-dimensional drawing data,
wherein the display controller determines the load of the three-dimensional graphics processor for each frame, and displays the two-dimensional drawing data in place of the three-dimensional drawing data when the load of the three-dimensional graphics processor is high.

4. The image processing device according to claim 3, further comprising:
an error detector that detects an error in the three-dimensional graphics processor,
wherein when the error detector detects an error, the display controller displays the two-dimensional drawing data in place of the three-dimensional drawing data.

5. The image processing device according to claim 4, further comprising:
a display time measurement device that measures a display time of the two-dimensional drawing data,
wherein when the measured display time is less than or equal to a predetermined time, the display controller displays the two-dimensional drawing data in place of the three-dimensional drawing data.

6. The image processing device according to claim 5, wherein the three-dimensional drawing command and the two-dimensional drawing command are commands for meter cluster drawing.

7. The image processing device according to claim 3, further comprising:
a three-dimensional drawing command generation device that generates the three-dimensional drawing command according to a drawing object.

8. The image processing device according to claim 3, further comprising:
a conversion table that indicates a correspondence between the three-dimensional drawing command and the two-dimensional drawing command.

9. An image processing method comprising steps of:
generating three-dimensional drawing data by a three-dimensional graphics processor based on a three-dimensional drawing command;
converting the three-dimensional drawing command into a two-dimensional drawing command;
generating two-dimensional drawing data by a two-dimensional graphics processor based on the two-dimensional drawing command; and
displaying the two-dimensional drawing data in place of the three-dimensional drawing data when a load of the three-dimensional graphics processor is high.

10. The image processing method according to claim 9, wherein the converting is performed based on a priority set in the three-dimensional drawing command.

11. The image processing method according to claim 10, wherein the load of the three-dimensional graphics processor is determined for each frame.

12. The image processing method according to claim 11, further comprising:
detecting an error in the three-dimensional graphics processor; and
displaying the two-dimensional drawing data in place of the three-dimensional drawing data when an error in the three-dimensional graphics processor is detected.

13. The image processing method according to claim 12, further comprising:
measuring a display time of the two-dimensional drawing data; and
displaying the two-dimensional drawing data in place of the three-dimensional drawing data when the measured display time is within a predetermined value.

14. The image processing method according to claim 11, wherein the converting from the three-dimensional drawing command to the two-dimensional drawing command is performed using a conversion table indicating a correspondence between the three-dimensional drawing command and the two-dimensional drawing command.

* * * * *